United States Patent
Ryan, Jr. et al.

(10) Patent No.: US 6,748,535 B1
(45) Date of Patent: *Jun. 8, 2004

(54) SYSTEM AND METHOD FOR SUPPRESSING CONDUCTED EMISSIONS BY A CRYPTOGRAPHIC DEVICE COMPRISING AN INTEGRATED CIRCUIT

(75) Inventors: Frederick W. Ryan, Jr., Oxford, CT (US); Monroe A. Weiant, Jr., Trumbull, CT (US); Edward J. Twarog, Norwalk, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/458,638

(22) Filed: Dec. 9, 1999

Related U.S. Application Data

(63) Continuation-in-part of application No. 09/217,977, filed on Dec. 21, 1998, now Pat. No. 6,594,760.

(51) Int. Cl.$^7$ .............................. G06F 1/26; G06F 12/14
(52) U.S. Cl. ...................... 713/189; 713/172; 713/184; 713/300
(58) Field of Search ................................. 713/172, 189, 713/193, 194, 300, 320, 321, 323, 324, 330, 340; 705/65; 380/1, 2

(56) References Cited

U.S. PATENT DOCUMENTS

| | | | |
|---|---|---|---|
| 4,641,346 A | 2/1987 | Clark et al. | 380/3 |
| 4,641,347 A | 2/1987 | Clark et al. | 380/3 |
| 4,725,718 A | 2/1988 | Sansone et al. | 235/49 |

(List continued on next page.)

FOREIGN PATENT DOCUMENTS

| | | | | |
|---|---|---|---|---|
| EP | 0268882 A1 | 12/1990 | | G06F/12/14 |
| EP | 0 463 261 A1 | 1/1992 | | G06K/11/06 |
| FR | 2793904 A | 5/1999 | | G05F/12/14 |
| GB | 929780 A | 6/1963 | | G05F/1/00 |
| JP | 08263972 A | * 10/1996 | | G11B/31/00 |
| WO | WO 9820461 A2 | 5/1998 | | G07B/1/00 |
| WO | WO 99/63423 | 12/1999 | | G06F/1/26 |
| WO | 99/66452 A1 | 12/1999 | | G06K/18/073 |
| WO | WO 00/26868 A1 | 5/2000 | | G07F/7/10 |
| WO | 00/50976 A1 | 8/2000 | | G06F/1/00 |
| WO | WO 00/54230 A1 | 9/2000 | | G07F/7/10 |

OTHER PUBLICATIONS

T. Inoue, JP 08–263972 A, "Recording and Reproduction Device," Oct. 11, 1996, Schreiber Translations, Inc., Translation into English.*

T. Inoue, JP–08–263972 A, "Record and Reproducing Device," Oct. 11, 1996, Japan Patent Office, Computer Translation into English. Retrieved from the Internet:<URL: http://www.ipdl.jpo.go.jp/homepg_e.ipdl>.*

(List continued on next page.)

*Primary Examiner*—Justin T. Darrow
(74) *Attorney, Agent, or Firm*—Brian A. Lemm; Angelo N. Chaclas

(57) ABSTRACT

System and method for performing cryptographic operations include providing at least one processor for performing cryptographic operations, memory coupled to the processor for use in performing the cryptographic operations; and a storage component coupled to the processor for storing and retrieving information calculated and used in the cryptographic operations. The processor, memory and storage component are securely enclosed whereby direct access to the cryptographic operations is prevented. At least the processor is comprised in an integrated circuit. A first power source, which is external to the secure enclosure, is coupled to and supplies power to the processor, the memory and the storage component. A second power source, which is within the housing of the integrated circuit, is coupled to and supplies power to at least the processor. A switch is included for switching from the first power source to the second power source when the cryptographic operations are being performed and for switching from the second power source to the first power source when non-cryptographic operations are being performed.

20 Claims, 6 Drawing Sheets-

U.S. PATENT DOCUMENTS

| | | | |
|---|---|---|---|
| 4,757,537 A | 7/1988 | Edelmann et al. | 380/51 |
| 4,775,246 A | 10/1988 | Edelmann et al. | 380/23 |
| 4,802,218 A | 1/1989 | Wright et al. | 380/23 |
| 4,831,555 A | 5/1989 | Sansone et al. | 364/51 |
| 4,853,961 A | 8/1989 | Pastor | 380/21 |
| 4,932,053 A | 6/1990 | Fruhauf et al. | 380/4 |
| 4,997,288 A * | 3/1991 | Rosenow | 380/2 |
| 5,500,601 A | 3/1996 | Lisart et al. | 324/713 |
| 5,533,123 A | 7/1996 | Force et al. | 380/4 |
| 5,995,629 A | 11/1999 | Reiner | 380/3 |
| 6,154,734 A | 11/2000 | Bailey et al. | 705/410 |
| 6,327,661 B1 * | 12/2001 | Kocher et al. | 713/193 |
| 6,419,159 B1 | 7/2002 | Odinak | 235/402 |
| 6,510,518 B1 * | 1/2003 | Jaffe et al. | 713/168 |
| 6,594,760 B1 * | 7/2003 | Ryan, Jr. et al. | 713/189 |

OTHER PUBLICATIONS

FIPS, 140–1, Security Requirements for Cryptographic Modules, National Institute for Standards and Technology Jan. 1994.

USPS draft specifications: Information Based Indicia program (IBIP) Indicium Specification Jun. 13, 1996.

Information Based Indicia Program Security Device Specification Jun. 13, 1996.

Information Based Indicia Program Host System Specification Oct. 9, 1996.

"Differential Power Analysis", Paul Kocher; Joshua Jaffe; Benjamin Jun, Crytography Research, Inc., 870 Market Street, Suite 1088, San Francisco, CA 94102; XP–000863414.

Kuhn, M., "Re: Power Analysis of AES Candidates" Internet Disclosure, The Mail Archive, Sep. 15, 1999, XP002232184.

* cited by examiner

SYSTEM AND METHOD FOR SUPPRESSING CONDUCTED EMISSIONS BY A CRYPTOGRAPHIC DEVICE COMPRISING AN INTEGRATED CIRCUIT

RELATED APPLICATIONS

This application is a continuation-in-part application of prior Application No. 09/217,977, filed Dec. 21, 1998, now U.S. Pat. No. 6,594,760 B1.

This application shares common elements of disclosure with commonly assigned U.S. application Ser. No. 09/455,015, filed Dec. 9, 1999; titled SYSTEM AND METHOD FOR PREVENTING DIFFERENTIAL POWER ANALYSIS ATTACKS (DPA) ON A CRYPTOGRAPHIC DEVICE.

BACKGROUND OF THE INVENTION

The subject invention relates generally to systems for carrying out cryptographic processes and, more particularly, to systems and methods for increasing the security of such systems; particularly such systems used to verify the payment of postage.

Cryptographic systems have many applications both for the secure transmission of information and for the authentication and verification of the source of information. One such application is the verification of postage.

The vast majority of the Posts around the world require prepayment for postal services provided by the Posts. Prepayment, however, requires verifiable evidence of paid postage. The traditional postage stamp is a prime example of such evidence.

Another is the use of postage meters, which alleviate some shortcomings of postage stamps. The first postage meters were mechanical devices which securely coupled printing and accounting functions. The mechanical meter, which was perfected over the years, became a widespread basic business machine. The accounting and machine control functions were computerized when electronic postage meters were introduced in the late seventies. This enabled new features, including departmental accounting and computerized meter resetting. However, the fundamental security of postage evidencing remained the same; depending on two features: 1) physical security of the printing process, i.e., printing of postage evidence can not occur without appropriate accounting, and 2) forensic detectability, i.e., fraudulent postal indicia can be distinguished from legitimate indicia.

Coupling the printing and accounting mechanism within a secure tamper-evident enclosure provides physical security of printing. Inspection of the device normally reveals tampering. Effective forensic detectability of fraudulent postal indicia depends on non-availability of alternative mechanisms suitable for forging indicia. Until recently, serious attempts to generate fraudulent indicia using an alternate printing mechanism were detectable.

Today, the possible use of readily available, inexpensive computerdriven printers for printing postage evidence offers new opportunities for customer convenience and substantial cost advantages. However, the use of such printers requires new ways of verifying postage evidence, as was first suggested in U.S. Pat. Nos. 4,641,3 47, 4,641,346, 4,757,537, and 4,775,246. At that time, it was realized that the security of postage evidencing depends on the security of the information printed in the indicium, including message authentication and integrity.

U.S. Pat. Nos. 4,831,555 and 4,725,718 extended this idea to unsecured printing of postage; disclosing the necessity that at least some of the information in the indicium must appear random to a party not in possession of some secret. Such random looking information is commonly referred to as a digital token.

The basis of postal revenue security in the digital world is two new requirements: 1) security of the digital token generating process, i.e., digital tokens can not be generated without appropriate accounting, and 2) automatic detectability, i.e., fraudulent digital tokens can be detected by automatic means.

A cryptographic transformation applied to selected data on the mailpiece produces the digital token. The data may include postage value, date, postal code of the geographical deposit area, recipient address information, meter data, and piece count. Such data is commonly referred to as postal data. The secret used to generate the digital token is generally a cryptographic key held within the accounting device. A verifier, with access to a verifying key corresponding to the accounting device secret, validates the digital token. Several cryptographic algorithms,and protocols have been considered for this purpose. U.S. Pat. No. 4,853,961 describes critical aspects of public-key cryptography for mailing applications. See Jose Pastor, CRYPTOPOST, A Universal Information-Based Franking System for Automated Mail Processing, Proceedings of the Fourth Advanced Technology Conference of the U.S. Postal Service, Vol. 1, pp. 429–442, November 1990. See also Jose Pastor, CRYPTOPOST, A Cryptographic Application to Mail Processing, Journal of Cryptology, 3 (2), pp. 137–146, November 1990.

Two methods of presenting a postal verifier with fraudulent evidence of payment are a counterfeited indicium and a copied indicium. The former is an unpaid indicium that appears legitimate; in particular which will satisfy a cryptographic verification process. The latter is a replica of a legitimate paid indicium. Such counterfeit indicia will necessarily satisfy any cryptographic verification process and must be detected by other means; e.g. duplicate mailpiece numbers, etc., which form no part of the present invention. The present invention addresses the prevention of counterfeit indicium.

A counterfeit indicium can be detected by verifying the digital token. Verification proves that the digital token was generated by a cryptographic algorithm with access to the secret meter key. The information printed in the indicium and access to a verifying key are sufficient for the detection of counterfeited indicia as long as the secret meter key is confidential. In a public-key system, a digital signature provides the data authentication and integrity check. In a symmetric-key system a message authentication code (MAC) provides a similar check.

Assuming integrity of the verification software and hardware, only a compromised meter secret-key can produce verifiable counterfeit indicia. Meters can be compromised by violating the physical protection of the key by tampering, or by deriving the key from indicia data by cryptanalysis. Generally, tampering is detectable if the physical protection of the secure component of the postage metering system is adequate, for example as set forth in FIPS 140-1, Security Requirements for Cryptographic Modules, National Institute for Standards and Technology, January 1994, and protection against physical tampering forms no part of the subject invention.

In general various cryptographic operations for generating digital tokens to authenticate postal indicia and to verify such indicia are well known and details of various systems need not be discussed further here for an understanding of the subject invention except to note that robustness of all such operations against cryptanalysis depends on the difficulty of solving certain mathematical problems, for example, discrete logarithm problems or factoring a large composite number. (see: The USPS published draft specifications: The INFORMATION BASED INDICIA PROGRAM (IBIP) INDICIUM SPECIFICATION, dated Jun. 13, 1996; The INFORMATION BASED INDICIA PROGRAM POSTAL SECURITY DEVICE SPECIFICATION, dated Jun. 13, 1996; and The INFORMATION BASED INDICIA PROGRAM HOST SYSTEM SPECIFICATION, dated Oct. 9, 1996, which together define the U.S.P.S.'s proposed requirements for a postage payment system based upon cryptographically secured indicia.)

As part of its proposed Information-Based Indicia Program (IBIP), the USPS has proposed 1024 bit RSA, 1024 bit DSS or 160 bit ECDSA as measures of robustness.

Presently, there are two postage metering types: closed systems and open systems. In a closed system, the system functionality is solely dedicated to metering activity. An open system metering device is a postage evidencing device with a non-dedicated printer; i.e. one that is not securely coupled to a secure accounting module and can be used for other purposes. Open system indicia printed by the non-dedicated printer are made secure by including addressee information in the encrypted evidence of postage printed on the mailpiece for subsequent verification. Examples of open system metering devices include personal computer (PC) based devices with single/multi-tasking operating systems, multiuser applications and digital printers.

Conventional closed system mechanical and electronic postage meters have heretofore secured the link between printing and accounting. The integrity of the physical meter box has been monitored by periodic inspections of the meters. Digital printing postage meters, which are closed system postage meters, typically include a digital printer coupled to a metering (accounting) device, which is referred to herein as a postal security device (PSD). Digital printing postage meters have removed the need for physical inspection by cryptographically securing the link between the accounting and printing mechanisms. In essence, new digital printing postage meters create a secure point to point communication link between the accounting unit and printhead. See, for example, U.S. Pat. No. 4,802,218, issued to Christopher B. Wright et al and now assigned to the assignee of the present invention.

An example of a digital printing postage meter with secure printhead communication is the Personal Post™ manufactured by Pitney Bowes Inc. of Stamford, CT. An example of a digital printing postage meter in a secure housing is the PostPerfect™ also manufactured by Pitney Bowes Inc. Either type of digitally printing system can use cryptographically secured digital tokens.

As noted above the security of cryptographically secured postage metering systems, as well as other cryptographic information systems, is based on an assumption that the secret information, i.e., the crypto keys, stored within a secure cryptographic device are protected against disclosure to any attacker. With physical security in effect, it has been assumed that an attacker could only obtain crypto keys either by trying all the possible crypto keys associated with the algorithm being used (symmetric algorithms) or by carrying out a complex mathematical search (asymmetric algorithms). For accepted cryptographic algorithms, this search is prohibitive, e.g. obtaining a 1024 bit RSA key requires 230 years of 300 Mhz PC computing.

A recently published technique, Differential Power Analysis (DPA), undermines this assumption and seriously threatens the security of cryptographic devices. The technique involves observation and analysis of fluctuations on the power line of a cryptographic device (hereinafter sometimes "conducted emissions") to determine the cryptographic secrets, i.e., the crypto keys, used by the device. DPA attack allows one to extract secret protected information from a supposedly secure cryptographic device by measuring variations in power consumption over time, and then applying sophisticated analysis to this information. As the cryptographic processor performs its cryptographic functions, such as encryption or signing; transistors comprising the process or switch on and off, which changes the amount of current drawn from the source supplying power to the processor. Assuming the attacker has some knowledge of the functions performed by the cryptographic processor, the attacker can correlate the current changes with data being processed and the crypto keys being used. Any type of secure cryptographic device that obtains its operating power from an external source is potentially susceptible to the attack. Such devices include smart cards, PC (PCMCIA) cards and printed circuit boards, including devices that are housed within a protected enclosure. If such a cryptographic device is subjected to DPA attack, then the crypto key can be obtained in a matter of days or weeks. Many of the proposed countermeasures to the DPA attack involve the introduction of signal noise or filters on the power line, random timing and delays during cryptographic processing, and the introduction of extraneous operations. These countermeasures make the attack much more difficult. However, an attacker can overcome them by obtaining more samples of power line fluctuations and applying more sophisticated analytical techniques.

While it is important that the security community at large find means either to defeat this attack, or to at least greatly lengthen the time and expertise needed to successfully carry it out, it is believed particularly important for the successful adoption of cryptographically secured postage metering systems. In many, if not most other cryptographic systems, cryptographic devices and their associated keys are in the custody of the "owner" who, in principle, has incentive to protect them. Postage metering systems however are not used in the custody of either party most concerned with system integrity, the system vendor or the Post, but by a mailer; who, if dishonest, has every reason to try to defeat the system. To further complicate the problem, a desired advantage of digital postage metering systems is the reduced need for physical inspections; further opening the window of opportunity for the dishonest mailer. And the large number of systems in use will greatly increase the chances that some will fall into the hands of the dishonest; and even a single meter which is compromised can be used to generate substantial amounts of fraudulent indicia since a successfully counterfeited indicium will not be readily detected by the methods used to detect simple duplicate indicia. Additionally postage metering systems can send thousands of encrypted messages, i.e. postal indicia, a day; greatly simplifying the sampling task of the DPA attacker. And all these problems must be overcome without adding substantially to postage costs.

Similar considerations also apply to other types of value metering systems, which are systems which similarly account for and evidence the delivery, receipt, or payment for other forms of value (e.g. tax stamp meters) by generating indicia or other types of messages, which may be secured cryptographically.

Thus it is an object of the subject invention to provide cryptographic devices, and particularly cryptographically secured postage metering systems, with protection against DPA attack.

BRIEF SUMMARY OF THE INVENTION

The above object is achieved and the disadvantages of the prior art are overcome in accordance with subject invention which includes a method and system for limiting conducted emissions by a cryptographic device performing cryptographic operations, the cryptographic device comprising an integrated circuit, the integrated circuit performing at least a substantial portion of the cryptographic operations. In accordance with the subject invention the cryptographic device is enclosed within a physically secure environment; power is provided to the cryptographic device from a first power source external to the physically secure environment; and at least a part of the integrated circuit is isolated from the first power source during at least a part of the substantial portion of the cryptographic operations.

In accordance with one aspect of the subject invention isolating the integrated circuit includes: locating a second power source within the housing of the integrated circuit; and providing power to at least the part of the integrated circuit from the second power source at least when the integrated circuit is performing the substantial portion of the cryptographic operations.

In accordance with another aspect of the subject invention the physically secure environment includes the housing.

In accordance with another aspect of the subject invention the second power source forms part of the integrated circuit.

In accordance with another aspect of the subject invention providing power to the integrated circuit includes: switching at least the part of the integrated circuit from the first power source to the second power source prior to or during the substantial portion of the cryptographic operations; and then switching at least the part of the integrated circuit from the second power source to the first power source subsequent to or during the substantial portion of the cryptographic operations.

In accordance with another aspect of the subject invention the second power source is a power storage circuit, the power storage circuit storing power from the first power source at least part of the time when the cryptographic operations are not being performed and providing power to at least the part of the integrated circuit the at least part of the time when the cryptographic operations are being performed.

In accordance with another aspect of the subject invention the cryptographic operations are divided into a plurality of segments and the second power source stores power from the external power source between alternate ones of the segments.

In accordance with another aspect of the subject invention the integrated circuit includes a row of cells and the power storage circuit is physically located at one end of the row of cells.

In accordance with another aspect of the subject invention the integrated circuit includes a row of cells wherein each of a plurality of capacitors included in the power storage circuit is located proximate to a corresponding one of the cells, and a switch included in the power storage is physically located at one end of the row of cells.

In accordance with another aspect of the subject invention, the subject invention can be similarly used in other types of value metering systems where cryptographically secured indicia are used as evidence of value received, delivered or purchased.

In accordance with another aspect of the subject invention the cryptographic operations generate a digital token for a postal indicium.

Other objects and advantages of the subject invention will be apparent to those skilled in the art from consideration of the attached drawings and the detailed description set forth below.

DETAILED DESCRIPTION OF THE INVENTION

Figure 1:
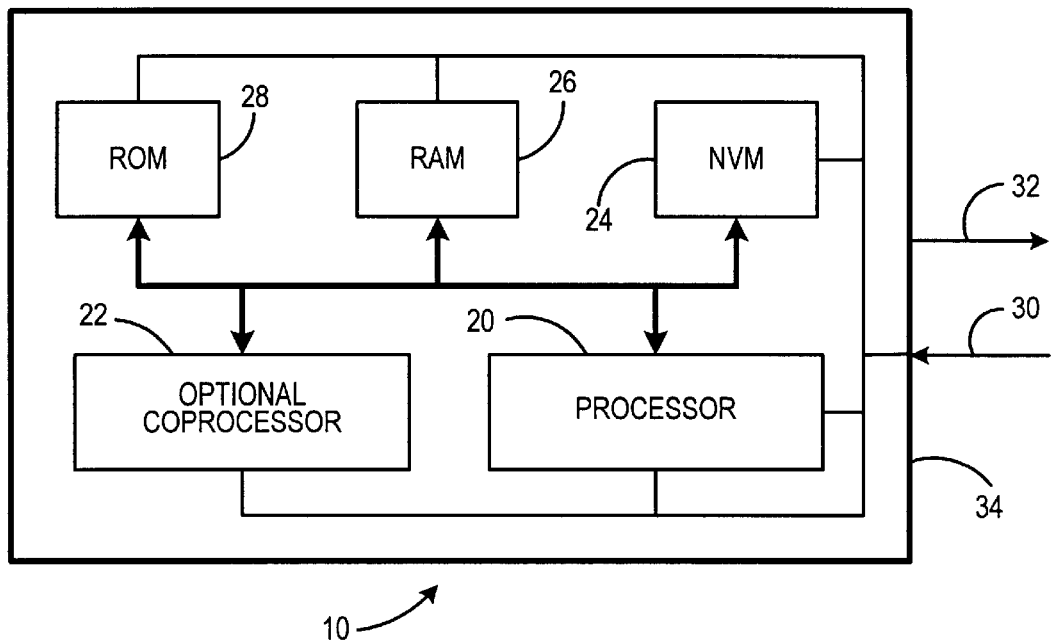
FIG. 1 is a block diagram of a traditional cryptographic device (prior art)

Referring now to FIG. 1, a block diagram of a traditional cryptographic device, generally designated 10, is shown. Cryptographic device 10 includes a conventional processor 20, coupled to an optional cryptographic coprocessor 22 for performing cryptographic operations, non-volatile memory 24, random access memory 26 and read-only memory 28. Cryptographic device 10 is enclosed within a secure housing 34. The secure housing 34 may be any conventional means for preventing access to cryptographic device 10. For example, secure housing 24 may be an integrated circuit chip encased in an epoxy or ceramic housing that prevents access to the integrated circuit without destruction of the integrated circuit. Power to cryptographic device 10 is input at power line 30. Input/output communications occur at I/O line 32. It will be understood that cryptographic device 10 may be implemented as any number of discrete components or as a single integrated circuit, such as a smart card.

In a preferred embodiment, device 10 can comprise a postage metering system where processor 20 is controlled by program code stored in read-only memory 28, to carry out the functions of a postage metering system such as accounting for postage in non-volatile memory 24 and controlling a printer (not shown) to print a postal indicium including a digital stoken formed by encryption of postal information by co-processor 22. Details of the construction, programming and operation of such postage metering systems are known and need not be discussed further here for an understanding of the subject invention except to note that, as discussed above, the protection of the crypto-keys used from side-channel attacks such as DPA is both critical to the security of such postage metering systems and difficult to achieve within the constraints of such systems.

In other embodiments of the subject invention device 10 can comprise other types of value metering systems.

Figure 2:
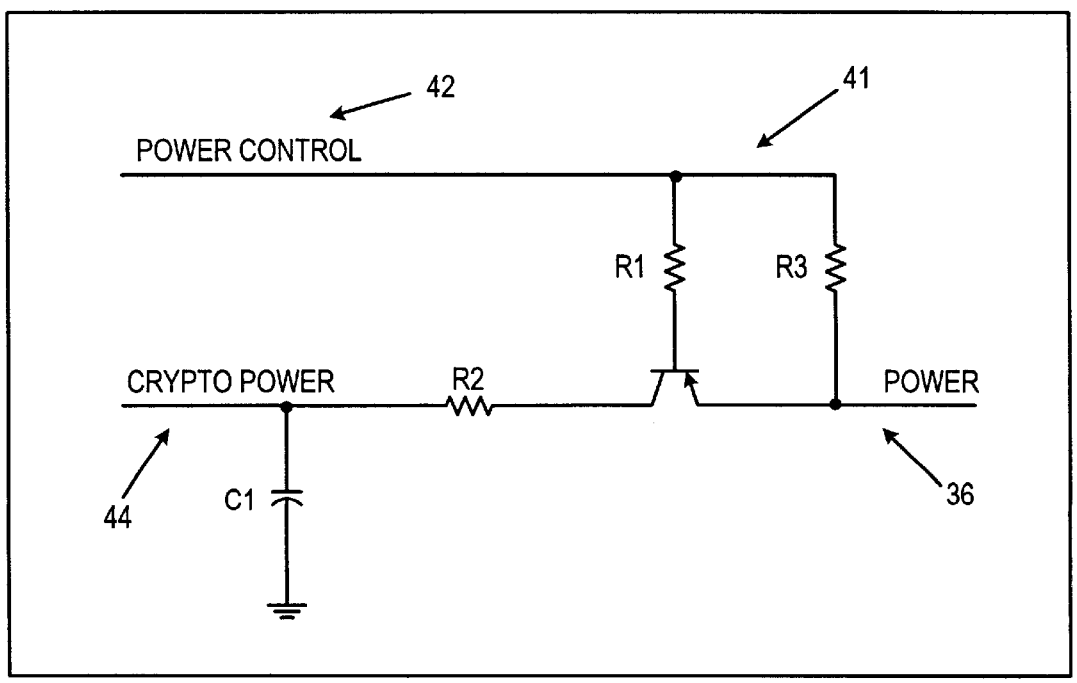
FIG. 2 is a temporary power storage circuit for use with the device of FIG. 1 in accordance with the present invention.

Referring now to FIG. 2, a power storage circuit, generally designated 40, is shown that can be used with cryptographic device 10 in accordance with the present invention. Power storage circuit 40, which is connected to power line 30 at line 36, includes a capacitor C 1, and a charging circuit 41 made up of transistor Q1, and three resistors R1, R2 and R3. By placing power storage circuit 40 between the external power input line 30 and crypto coprocessor 20 transistor Q1 acts as a switch under control of power control 42, so that circuit 40 controls whether power is supplied by the external power input at power line 30 or capacitor C1.

When processor 20 (or co-processor 22, depending upon the details of the programming) determines that cryptographic operations are not being performed, the power control line, generally designated 42, is used to close switch 41, i.e. transistor Q1, allowing capacitor C1 to accumulate charge. During cryptographic operations, processor opens switch 41 and the charge stored in capacitor C1 is used to power cryptographic coprocessor 22 through the crypto power line, generally designated 44. When switch 41 is open, no power fluctuations of cryptographic coprocessor 22 are conducted out the external power input line 30 and, therefore, fluctuations on line 30 cannot be correlated with individual cryptographic operations, and DPA cannot be performed.

Particular values for components of circuit 40 in particular applications will depend upon the power drawn by the load of co-processor 22, the time for: which power is to be drawn from capacitor C1, the minimum voltage required for operation, and the energy available for recharge. Selection of these values for particular applications is well within the abilities of a person skilled in the art.

In some implementations, a storage device large enough to supply power for the entire cryptographic operation cannot be implemented. For example, when cryptographic device 10 is a single integrated circuit and power storage circuit 40 is part of the integrated circuit, a large enough capacitor C1 to supply power for the entire cryptographic operation may not be available. In such implementations, a smaller storage device can be used to supply power for part of the cryptographic operation. The cryptographic processing can be halted while the storage device recharges and resumed after the storage device has been sufficiently charged. Alternatively, processing can continue while the storage device recharges. However, in either case information concerning the cryptographic key used in the cryptographic operation will be conducted out the external power input line 30 although not to the same degree as without the circuit in place. If either of these techniques is used in conjunction with the proposed countermeasures discussed previously (the introduction of signal noise or filters on the power line, random timing and delays during cryptographic processing, and the introduction of extraneous operations) a high level of DPA resistance can be achieved.

It is immediately apparent from inspection of FIG. 2 that circuit 40 must be within housing 34 and that security against DPA attacks depends upon the integrity of housing 34. If an attacker can penetrate housing 34 DPA can be conducted on line 44 whether or not co-processor 22 is powered from external power line 36. For this reason embodiments of the subject invention where device 10, or at least that part of the device which performs cryptographic operations, e.g. co-processor 22, is comprised in an integrated circuit which also includes circuit 40 are desirable. Without great difficulty the hermetically sealed housing of an integrated circuit cannot be penetrated without making the circuit inoperative. Thus it is believed that the conventional housing of an integrated circuit will provide a highly effective embodiment of, or supplement for, housing 34 without substantial increase in the cost of the integrated circuit. As discussed above this will be particularly advantageous in postage metering systems.

Unfortunately, storage devices with sufficient capacity to power a substantial portion of the cryptographic operations are, with present technology, too large to implement on an integrated circuit. This difficulty is overcome in accordance with the subject invention by taking advantage of the conventional design of integrated circuits.

Figure 3:
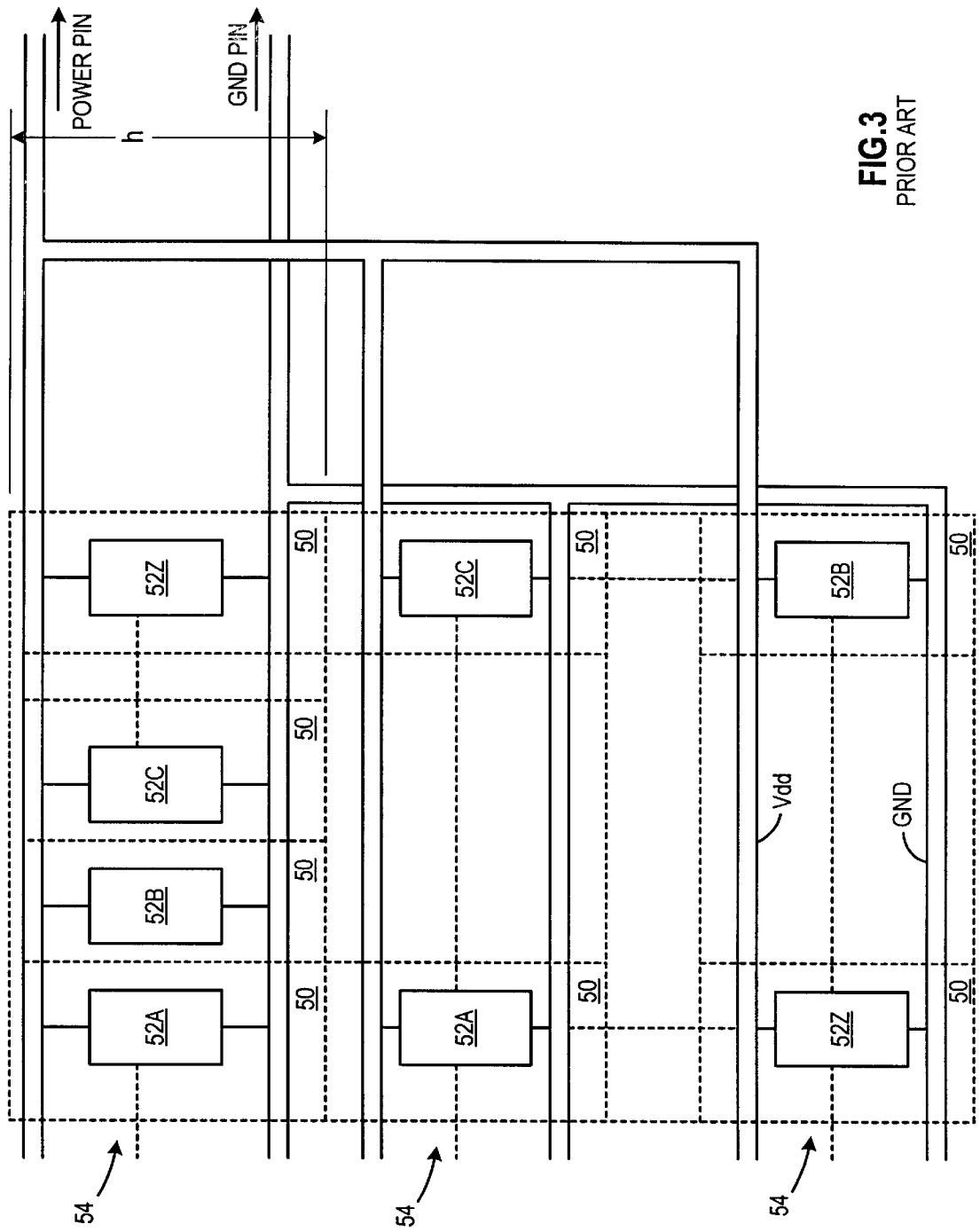
FIG. 3 is a semi-schematic block diagram of a conventional layout of an integrated circuit comprising an array of standard cells.

FIG. 3 shows the conventional layout of an integrated circuit formed from a variety of standard cells 50. Cells 50 comprise one various configurations of components 52A, 52B, 52C, 52Z, etc. and are arranged in a matrix and interconnected by metallization (not shown) to form an integrated circuit. Cells 50 are of a standard height h and have power and ground connections routed across the top and bottom so that when cells 50 are arranged in rows 54 the power and ground connections abut to form power bus Vdd and ground bus Gnd which are then connected in common with the Vdd pin and ground pin to provide power to the circuit.

Figure 4:
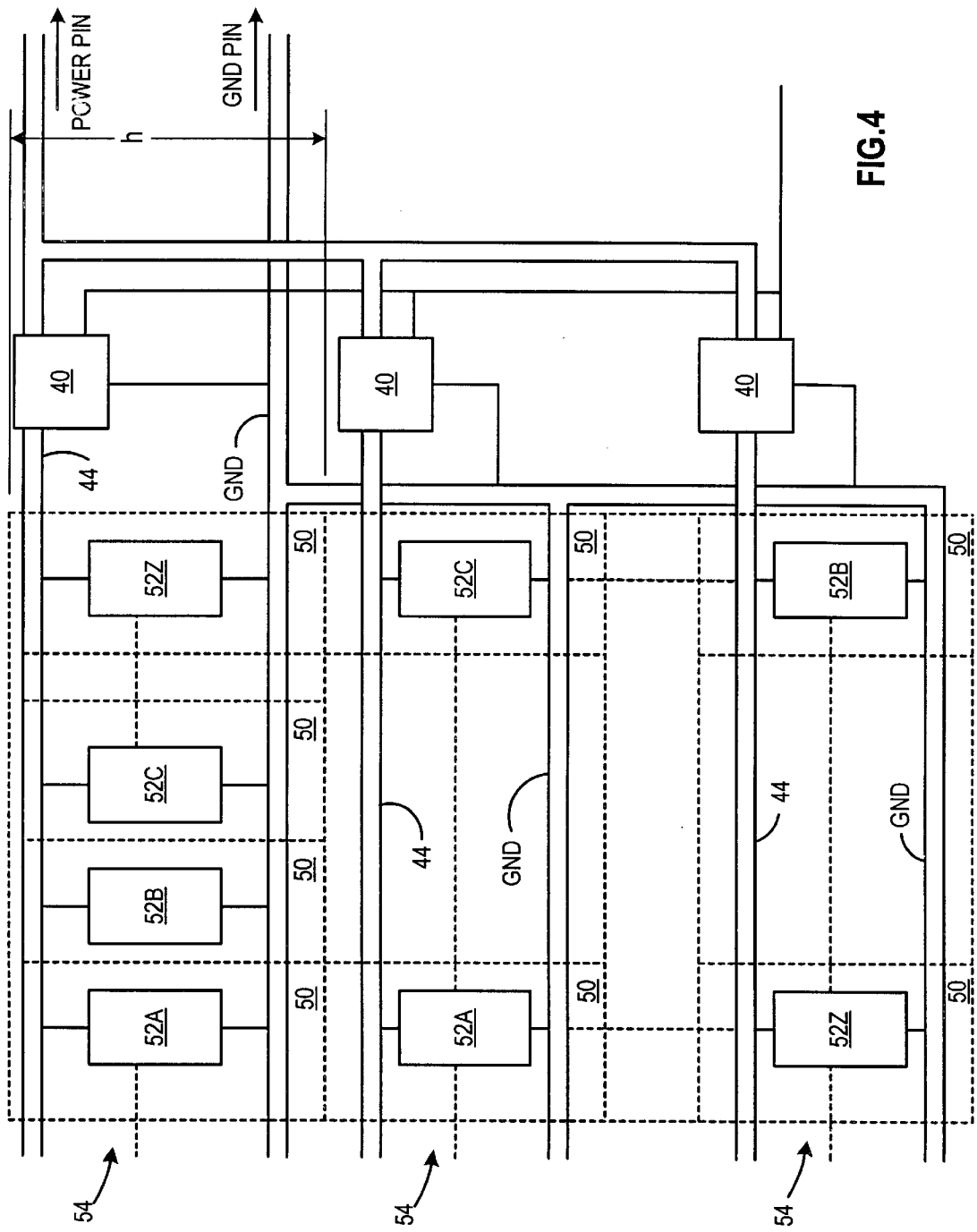
FIG. 4 is a semi-schematic block diagram of an integrated circuit having a storage circuit in accordance with an embodiment of the subject invention.

FIG. 4 shows incorporation of storage circuits as described above into the integrated circuit of FIG. 3. Circuits 40, substantially as shown in FIG. 2 (with appropriate component values) are connected between crypto power busses 44 (physically the same as busses Vdd) and the Vdd pin and busses Gnd at the end of each, or selected ones, of rows 54. A power control signal can be supplied either internally from the integrated circuit to power each row from circuits 40 during at least a substantial portion of the cryptographic operations performed by the circuit; or from an external device which knows when cryptographic operations are being performed.

Since each storage circuit provides power to only a fraction of the integrated circuit the capacitors can be made very small and it is believed that individual circuits can be positioned at the end of each of rows 54 with minimal change to the layout of the integrated circuit while provision of a single storage circuit to power the whole integrated circuit would be very difficult or impossible within the constraints of the integrated circuit's geometry. In particular it should be noted that no change to the design or layout of the array of standard cells is needed.

Figure 5:
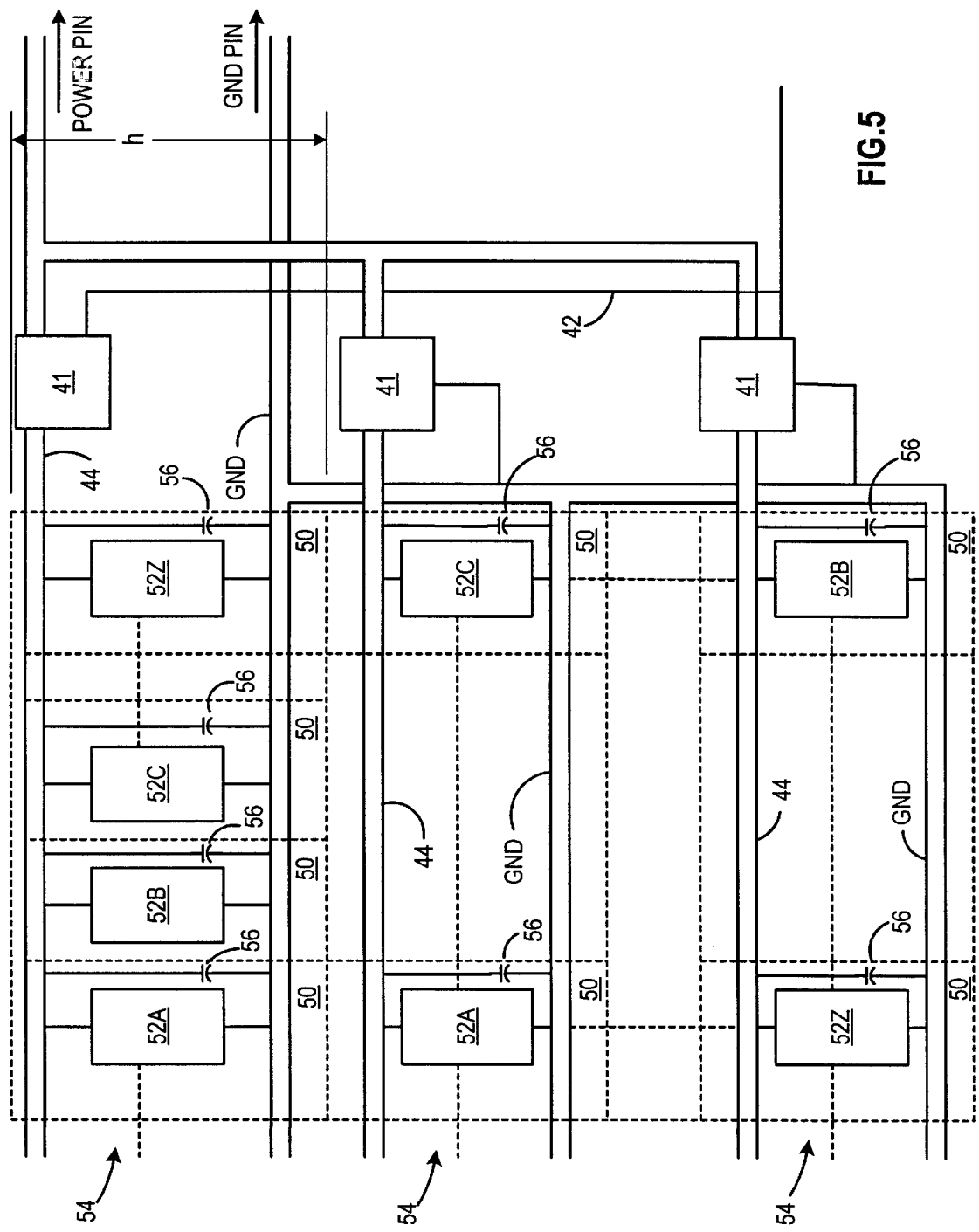
FIG. 5 is a semi-schematic block diagram of an integrated circuit having a storage circuit in accordance with an alternative embodiment of the subject invention.

FIG. 5 shows another embodiment of the subject invention wherein only charging circuits 41 are positioned at the ends of rows 54, and each of cells 50 is slightly modified by the incorporation of capacitors 56 between bus 44 and bus Gnd for that row. Capacitors to power only a single cell are believed to be sufficiently small that they can be incorporated into an integrated circuit which would not have room for storage circuits sized to power a full row; though at the cost of redesign of the standard cells.

Figure 6:
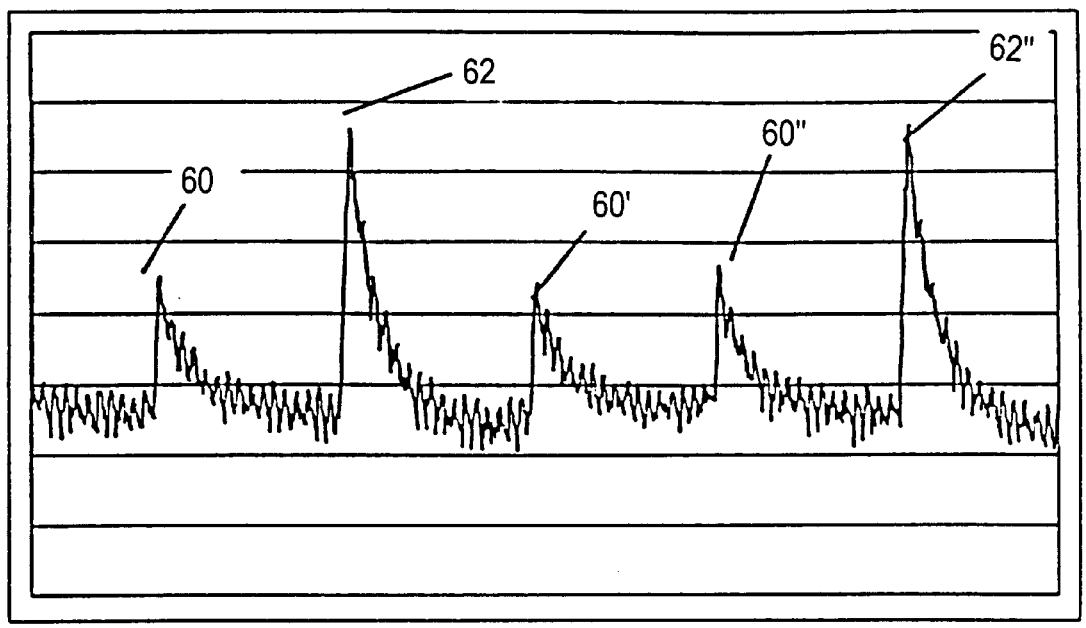
FIG. 6 is a graph which is representative of the current drawn by a portion of an RSA signature generation performed by the device of FIG. 1 prior implementation to the present invention.

Referring now to FIG. 6, a graph is shown which is representative of the current drawn, as measured at line 30, by a portion of an RSA signature generation performed by cryptographic device 10 prior to implementation of the invention. The difference between squaring and multiply operations can be clearly seen. Multiply operations 62 require more power and therefore are represented by the higher peaks than, squaring operations 60. The RSA key used can be easily derived from the graph of FIG. 5. A1 is represented by a square followed by a multiply (60–62 and 60"–62"), while a zero is represented by simply a square (60').

Figure 7:
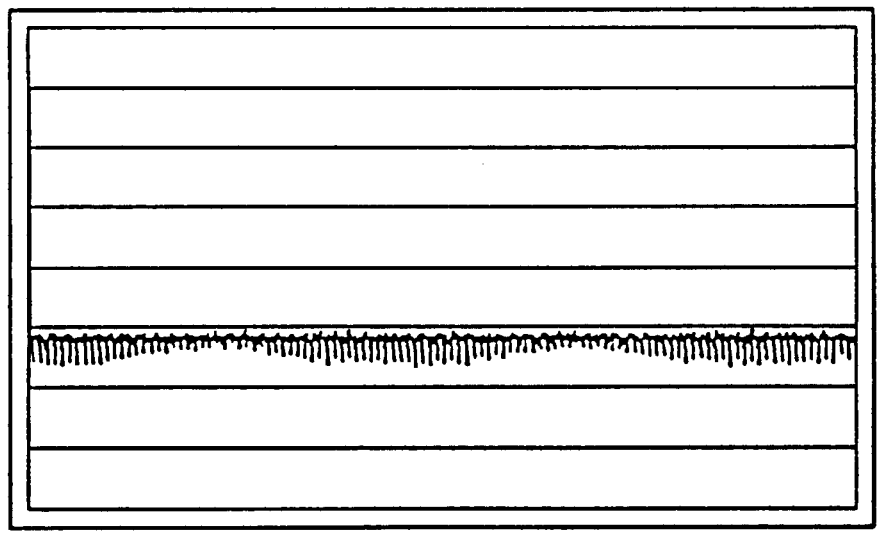
FIG. 7 a graph which is representative of the current drawn by a portion of an RSA signature generation performed by the device of FIG. 1 after implementation of the present invention.

Referring now to FIG. 7, a graph is shown which illustrates the effectiveness of the present invention. The same portion of the RSA signature generation as shown in FIG. 6 is depicted in FIG. 7 after the addition of power storage circuit 40, in the form of an external circuit, to cryptographic device 10. It is noted that the peaks representative of the square and multiply operations previously observable in FIG. 6 are no longer observable in FIG. 7.

Figure 8:
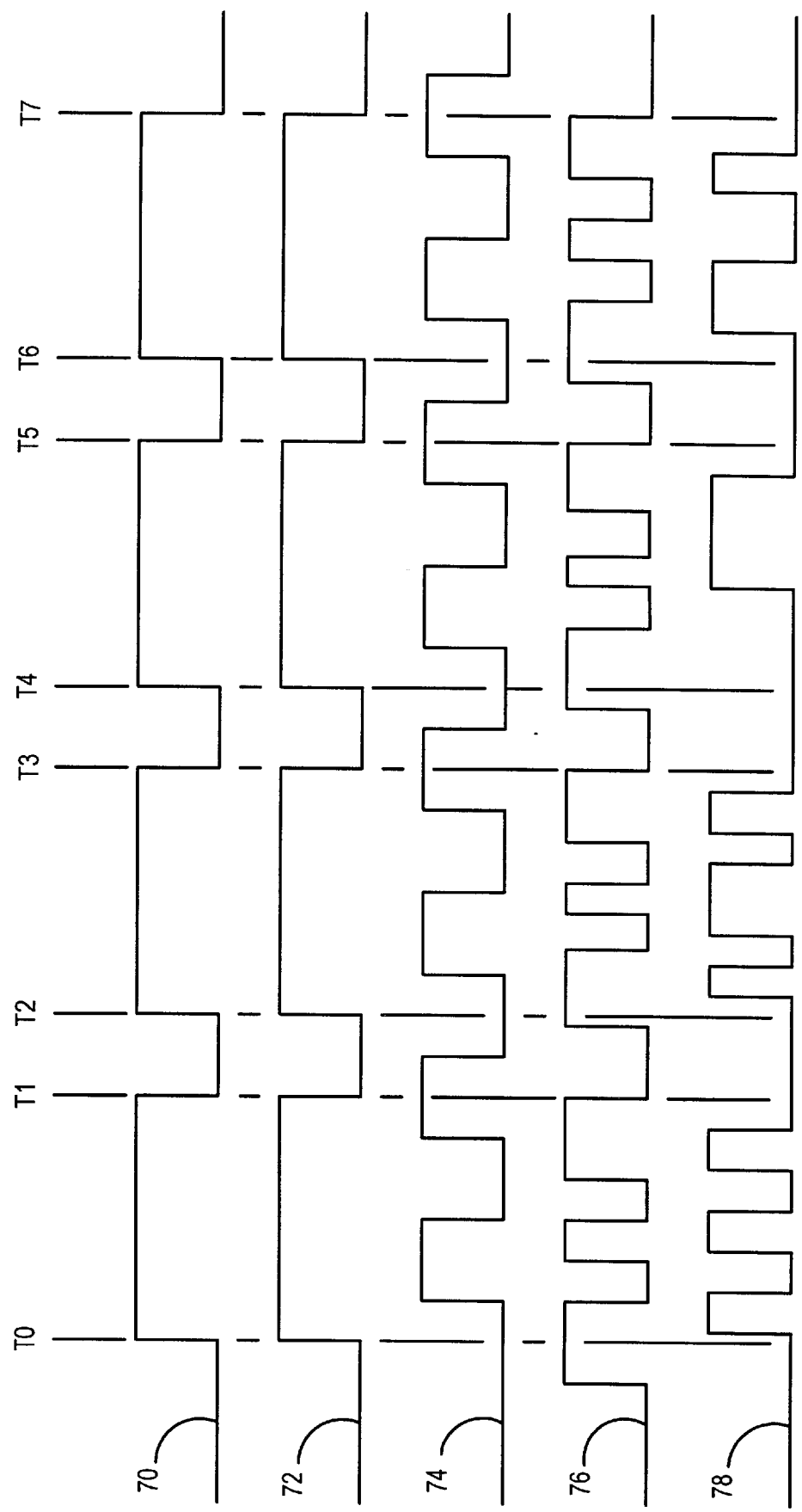
FIG. 8 is a timing diagram of alternative embodiments of the subject invention.

A discussed above, the required storage capacity can be reduced still further by providing power from the storage circuits for only a fraction of the cryptographic operations. The cryptographic operations are divided into segments which are alternately powered from the storage circuits and the external power source. FIG. 8 shows various embodiments of the subject invention wherein the cryptographic operations are variously segmented.

Time line 70 shows cryptographic operations occurring between times T0 and T1, T2 and T3, etc. (Note that the cryptographic operations are shown as occurring regularly only for ease of illustration and generally will vary in both frequency and duration.) Time line 72 shows an embodiment of the subject invention wherein power is drawn from the storage circuits for the full duration of the cryptographic operations. This embodiment provides the maximum protection against DPA but requires the greatest capacity. Time line 74 shows an embodiment wherein alternately powered segments are distributed regularly over the cryptographic operations and in a fixed order over successive operations. Time line 76 shows an embodiment wherein alternately powered segments are distributed selectively over the cryptographic operations so that the most critical operations occur when power is taken from the storage circuits and in a fixed order over successive operations. Time line 76 shows an embodiment wherein alternately powered segments are distributed randomly over the cryptographic operations.

It is believed that a fixed order of segmentation will provide the greatest degree of protection against advanced DPA attacks.

While the present invention has been disclosed and described with reference to embodiments thereof, it will be apparent, as noted above, that variations and modifications may be made therein. It is, thus, intended in the following claims to cover each variation and modification that falls within the true spirit and scope of the present invention.

What is claimed is:

1. A method of limiting conducted emissions by a cryptographic device performing cryptographic operations, said cryptographic device comprising an integrated circuit having a secure housing, said integrated circuit performing at least a portion of said cryptographic operations, the method comprising the steps of:

providing power to said integrated circuit from a first power source, said first power source being external to the secure housing locating a second power source within said secure housing for said integrated circuit, said second power source forming part of said integrated circuit;

isolating at least a part of said integrated circuit from said first power source during at least a part of said portion of said cryptographic operations; and providing power to said at least a part of said integrated circuit from the second power source at least part of the time when said integrated circuit is performing said at least a part of said portion of said cryptographic operations.

2. The method of claim 1 wherein the step of providing power includes the steps of:

switching at least said part of said integrated circuit from said first power source to said second power source prior to or during said portion of said cryptographic operations; and switching at least said part of said integrated circuit from the second power source to the first power source subsequent to or during said portion of said cryptographic operations.

3. The method of claim 1 wherein said second power source is a power storage circuit, said power storage circuit storing power from said first power source and providing power to said at least part of said integrated circuit during said at least part of the time when said integrated circuit is performing said at least a part of said portion of said cryptographic operations.

4. The method of claim 3 wherein said cryptographic operations are divided into a plurality of segments and wherein said second power source stores power from the first power source between alternate ones of said segments.

5. The method of claim 4 wherein said segments are distributed over said cryptographic operations in a fixed order.

6. The method of claim 4 wherein said segments are distributed over said cryptographic operations in a random order.

7. The method of claim 3 wherein said part of said integrated circuit includes a row of cells and said power storage circuit is physically located at one end of said row of cells.

8. The method of claim 3 wherein said part of said integrated circuit includes a row of cells and said power storage circuit includes a plurality of capacitors, each of the plurality of capacitors being located proximate to a corresponding one of said cells.

9. The method of claim 1 wherein said cryptographic operations generate a digital token for a postal indicium.

10. The method of claim 1 wherein said cryptographic operations generate a secure message for a value metering system.

11. A cryptographic system for performing cryptographic operations, comprising:

an integrated circuit including a processor for performing cryptographic operations, said integrated circuit having a secure housing;

a first power source coupled to and supplying power to said processor, said first power source being external to said secure housing of said integrated circuit;

a second power source within the secure housing of said integrated circuit coupled to and supplying power to at least a part of said processor, said second power source forming part of said integrated circuit; and a switch responsive to a power control signal from said processor for switching between said first power source and said second power source, said switch isolating said at least a part of said processor from said first power source and connecting said at least a part of said processor to said second power source, said second power source providing power to said at least a part of said processor when said processor is performing at least a portion of said cryptographic operations.

12. The system of claim 11 wherein said second power source is a power storage circuit.

13. The system of claim 12 wherein said power storage circuit includes a capacitor, said capacitor being charged at least part of the time and discharged to supply power to said at least a so part of said processor at least part of the time when said cryptographic operations are being performed.

14. The system of claim 13 wherein said cryptographic operations are divided into a plurality of segments and wherein said power storage circuit is recharged between alternate ones of said segments.

15. The system of claim 14 wherein said segments are distributed over said cryptographic operations in a fixed order.

16. The system of claim 14 wherein said segments are distributed over said cryptographic operations in a random order.

17. The system of claim 13 wherein said part of said processor includes a row of cells and said power storage circuit is physically located at one end of said row of cells.

18. The system of claim 13 wherein said part of said processor includes a row of cells and a respective capacitor is located proximate to each of said cells in said row.

19. The system of claim 11 wherein said cryptographic operations generate a digital token for a postal indicium.

20. The system of claim 11 wherein said cryptographic operations generate a secure message for a value metering system.

* * * * *